US009534121B2

(12) United States Patent
Thorlaksen et al.

(10) Patent No.: US 9,534,121 B2
(45) Date of Patent: Jan. 3, 2017

(54) FOULING CONTROL COATING COMPOSITIONS

(75) Inventors: Peter Christian Weinrich Thorlaksen, Solrød Strand (DK); Anders Blom, Espergærde (DK); Ulrik Bork, Fredensborg (DK)

(73) Assignee: HEMPEL A/S, Lyngby (DK)

( * ) Notice: Subject to any disclaimer, the term of this patent is extended or adjusted under 35 U.S.C. 154(b) by 34 days.

(21) Appl. No.: 13/518,161

(22) PCT Filed: Dec. 22, 2010

(86) PCT No.: PCT/EP2010/070509
§ 371 (c)(1),
(2), (4) Date: Jun. 21, 2012

(87) PCT Pub. No.: WO2011/076856
PCT Pub. Date: Jun. 30, 2011

(65) Prior Publication Data
US 2012/0264847 A1 Oct. 18, 2012

(30) Foreign Application Priority Data

Dec. 22, 2009 (EP) .................................... 09180360

(51) Int. Cl.
*C09D 5/16* (2006.01)
*C08F 283/00* (2006.01)
*C08F 283/12* (2006.01)
*C08G 77/00* (2006.01)
*C08G 77/38* (2006.01)
*C08L 83/00* (2006.01)
*C09D 7/12* (2006.01)
*C09D 183/04* (2006.01)
*C08G 77/02* (2006.01)
*C08G 77/16* (2006.01)
*C08G 77/46* (2006.01)
*C08K 5/57* (2006.01)
*C08L 51/08* (2006.01)

(52) U.S. Cl.
CPC ........... *C09D 5/1675* (2013.01); *C09D 5/1606* (2013.01); *C09D 7/125* (2013.01); *C09D 183/04* (2013.01); *C08G 77/02* (2013.01); *C08G 77/16* (2013.01); *C08G 77/46* (2013.01); *C08K 5/57* (2013.01); *C08L 51/085* (2013.01)

(58) Field of Classification Search
CPC ....... C09D 5/16; C09D 5/1675; C09D 5/1606; C09D 7/125; C09D 183/04; C08G 77/02; C08G 77/16; C08G 77/46; C08K 5/57; C08L 51/085
USPC ....................................................... 523/122
See application file for complete search history.

(56) References Cited

U.S. PATENT DOCUMENTS

| 5,958,116 A | 9/1999 | Kishihara et al. |
| 6,033,648 A † | 3/2000 | Candau |
| 6,107,381 A | 8/2000 | Stein et al. |
| 6,291,549 B1 | 9/2001 | Mechtel et al. |
| 6,313,193 B1 | 11/2001 | Simendinger, III |
| 7,377,968 B2 | 5/2008 | Reybuck et al. |
| 2002/0197490 A1 | 12/2002 | Amidaiji et al. |
| 2004/0006190 A1 | 1/2004 | Sakamoto et al. |
| 2010/0137529 A1* | 6/2010 | Williams ............. C09D 5/1675 525/474 |

FOREIGN PATENT DOCUMENTS

| EP | 0 978 520 | * | 2/2000 |
| EP | 1275705 A1 † | | 1/2003 |
| EP | 2 103 655 A1 | | 9/2009 |
| EP | 2103655 A1 * | | 9/2009 |
| JP | 63-43973 A | | 2/1988 |

(Continued)

OTHER PUBLICATIONS

Database WPI, Week 200618, Thomson Scientific, London, GB; AN 2006-169208, XP002583366.
Ash et al., Handbook of Paint and Coating Raw Materials, vol. 1, 1996, Gower Publ. Ltd., Great Britain, pp. 821-823 and 849-851.
Resin-Modifying Silicone, Dow Corning Toray Co., Ltd. (Oct. 2008).
Technical Data Sheet of KF-6011 of Shin-Etsu Chemical Co., Ltd., Emulsifying Linear Silicone (2012).

(Continued)

*Primary Examiner* — Susannah Chung
*Assistant Examiner* — Robert T Butcher
(74) *Attorney, Agent, or Firm* — Birch, Stewart, Kolasch & Birch, LLP

(57) ABSTRACT

The present application discloses a fouling control coating composition comprising a polysiloxane-based binder system, 0.01-20% by dry weight of one or more hydrophilic-modified polysiloxanes, and one or more biocides. The hydrophilic-modified polysiloxane may be a poly(oxyalkylene)-modified polysiloxane, e.g. a polysiloxane having grafted thereto poly(oxyalkylene) chains and/or having incorporated in the backbone thereof poly(oxyalkylene) chains. The poly(oxyalkylene) may e.g. be selected from polyoxyethylene, polyoxypropylene and poly(oxyethylene-co-oxypropylene) (polyethylene glycols/polypropylene glycols). The application further discloses a marine structure comprising on at least a part of the outer surface thereof an outermost coating prepared from the coating composition. Moreover, the application discloses the use of the combination of non-reactive hydrophilic-modified polysiloxanes and biocides, wherein the weight ratio between the hydrophilic-modified polysiloxanes and the biocides is in the range 1:0.2 to 1:6, for improving the antifouling properties of a polysiloxane based coating composition.

23 Claims, No Drawings

(56) References Cited

FOREIGN PATENT DOCUMENTS

| JP | 10-316933 A | 12/1998 |
|---|---|---|
| JP | 11-293183 A | 10/1999 |
| JP | 2001-342192 † | 12/2001 |
| JP | 2003-238886 A | 8/2003 |
| JP | 2006 052283 A | 2/2006 |
| JP | 2006-188453 A | 7/2006 |
| JP | 2006 299132 A | 11/2006 |
| JP | 2007-56052 A | 3/2007 |
| JP | WO 2009/004010 A1 | 1/2009 |
| JP | 2009-215527 † | 9/2009 |
| JP | 2009-235373 A | 10/2009 |
| WO | WO-95/32862 A1 | 12/1995 |
| WO | WO-00/77102 A1 | 12/2000 |
| WO | WO-02/088043 A1 | 11/2002 |
| WO | WO-2007/053163 A2 | 5/2007 |
| WO | WO-2008/132195 A1 | 11/2008 |
| WO | WO-2008/132196 A1 | 11/2008 |
| WO | WO-2009/067565 A2 | 5/2009 |

OTHER PUBLICATIONS

TSF451 Series. Momentive Performance Materials Japan LLC (Jul. 2007).

Kavanagh, C. J. et al, "The Effects of Silicone Fluid Additives and Silicone Elastomer Matrices on Barnacle Adhesion Strength," Biofouling, Dec. 2003, vol. 19, No. 6, pp. 381-390.

Shin-Etsu Chemical Co., Ltd., Shin-Etsu Silicone: Reactive & Non-Reactive Modified Silicone Fluid, pp. 1-10 (Jul. 2006 & Dec. 2009).†

\* cited by examiner
† cited by third party

FOULING CONTROL COATING COMPOSITIONS

This application is the National Stage Under 35 U.S.C. §371 of PCT International Application No, PCT/EP2010/070509 filed on Dec. 22, 2010, which claims priority under 35 USC §119 of Application No. 09180360.1 filed in Europe on Dec. 22, 2009. The entire contents of each of which are incorporated by reference.

FIELD OF THE INVENTION

The present invention relates to novel fouling control coating compositions.

BACKGROUND OF THE INVENTION

Traditionally, silicone formulations rely on physical means, this being mainly a factor of modulus of elasticity and surface tension to create a low fouling surface. The traditional polydimethylsiloxane (PDMS) coatings have shown difficulty in resisting slime fouling over time, thus decreasing the advantage of drag reduction.

Hence, there is a need for fouling control polysiloxane-based coating compositions combining the benefits of conventional polysiloxane-based fouling-release coating compositions with the benefits of biocide-based antifouling coating compositions.

WO 2007/053163 discloses an antifouling material that may include one or more of a number of suitable copolymers (e.g. block copolymers, graft copolymers, etc.) which provide biocidal and/or fouling release characteristics. The copolymers may include a polysiloxane backbone with one or more polymers grafted onto the polysiloxane backbone. Such grafted polymers may carry biocidal groups.

WO 2008/132195 discloses an antifouling coating composition comprising a curable polymer (e.g. an organosiloxane-containing polymer) and an organosilicone polymer.

WO 2008/132196 discloses a method to physically deter marine fouling which method involves forming on the substrate a coating composition comprising curable polyorganosiloxane, polyoxyalkylene block copolymer, organosilicon cross-linking agent and/or catalyst. The polyoxyalkylene is reacted to the silicone binder by addition reaction (vinyl/hydrid) to form a block copolymer of polyoxyalkylene and polysiloxane. The copolymer can subsequently be terminated with vinyltrimethoxysilane to form a moisture curable binder.

US 2004/006190 discloses a room-temperature curable organopolysiloxane composition, which includes (A) an organopolysiloxane with the terminals blocked with a hydroxyl group, a hydrolysable group, or both these types of groups, and (B) an organosilicon compound containing a hydrolysable group, a partial hydrolysis-condensation product thereof, or a mixture of the two, and (C) a polysiloxane with at least one oxyalkylene group bonded to a silicon atom via, for example, a C—C—Si linkage.

WO 2002/088043 discloses a process for coating a siliceous substrate with a silicon-containing layer, wherein in a first step a layer comprising a biocide is applied.

US 2002/0197490 A1 discloses a curable antifouling polysiloxane based composition comprising hydrophobic silica possibly in combination with hydrophilic silica. In some embodiments, the composition further comprises a silicone oil, e.g. oils comprising polyethylene glycol or polypropylene glycol moieties. It is further envisaged, that antifouling agents may be used, in particular copper and inorganic copper compounds.

EP 2 103 655 A1 discloses a curable antifouling polysiloxane based composition comprising a reaction curable silicone rubber and a particularly designed organopolysiloxane mixture. In some embodiments, the composition further comprises a silicone oil, e.g. a polyether-modified silicone oil. It is further envisaged, that antifouling agents may be used, in particular copper and inorganic copper compounds.

U.S. Pat. No. 6,313,193 B1 i.a. discloses a composition comprising a silanol-terminated polydimethyl siloxane, a dimethylethoxy-terminated polydimethyl siloxane, polydiethoxy siloxane, and benzalkonium chloride. The polydiethoxy siloxane reacts with the polydimethyl siloxanes so that the polydiethoxy siloxane becomes an integral part of the binder network.

JP 2006 052283 A discloses a coating composition comprising a polyether-modified silicone oil having polyoxyalkylene side chains, an acrylic type binder system based on a polysiloxane macropolymer and an antifoulant.

JP 2006 299132 A discloses an antifouling coating composition which is based on a vinyl copolymer binder system which include polysiloxane side chains, and which is modified with certain reactive silanes, and which further comprises, e.g., an poly(oxyalkylene)-modified polysiloxane. The composition may also include an antifouling agent.

The silicone based fouling release coatings have demonstrated an advantage over conventional antifouling coatings showing significant lower drag resistance, hence reduced fuel consumption of marine vessels. The difference is especially obvious as long as the silicone coating is free from marine fouling including slime fouling. Many conventional silicone coatings have until now only been able to maintain a slime free surface for a shorter period.

Some traditional biocide containing antifouling coatings have demonstrated a greater resistance towards marine fouling compared to the silicone based fouling release coatings under, e.g., static conditions. The surface characteristics of such a coating will however lead to an increased drag resistance compared to silicone coatings even when the surface is fouling free.

The rationale behind the present invention has been to prolong the slime free period of a silicone based coating by combining the biocidal components from the antifouling coatings with a silicone based fouling release coating. This provides a coating with low drag resistance that will remain fouling free for a longer time than conventional silicone based fouling release coatings.

SUMMARY OF THE INVENTION

In view of the above-mentioned needs, the present inventors have now developed new fouling control coating compositions which comprise biocides and one or more hydrophilic-modified polysiloxanes which facilitate and control the leaching of the biocides. In this way, the advantages of silicone fouling release are combined with those of traditional anti-fouling coatings, thus gaining a foul-free, low-friction surface with the use of a relatively small amount of biocide.

The present inventors have realised that the use of certain hydrophilic-modified polysiloxanes, in particular poly(oxyalkylene)-modified polysiloxanes, (see further below) renders it possible to obtain a media for water- and biocidal transport through a cross-linked polysiloxane film, in particular a film of a polysiloxane-based coating composition. The leach rate of the biocide can be controlled amongst others by the amount and the hydrophilicity/hydrophilic moieties of the added polysiloxane(s).

So, in a first aspect the present invention relates to a fouling control coating composition comprising a polysiloxane-based binder system, 0.01-20% by dry weight of one or more hydrophilic-modified polysiloxanes, and one or more biocides.

A second aspect of the invention relates to a marine structure comprising on at least a part of the outer surface thereof an outermost coating prepared from a coating composition as defined herein.

In currently preferred embodiments of the above aspects, the weight ratio between the one or more hydrophilic-modified polysiloxanes and the one or more biocides is in the range 1:0.2 to 1:6.

A third aspect of the invention relates to the use of the combination of one or more non-reactive hydrophilic-modified polysiloxanes and one or more biocides, wherein the weight ratio between the one or more hydrophilic modified polysiloxanes and the one or more biocides is in the range 1:0.2 to 1:6, for improving the antifouling properties of a polysiloxane based coating composition.

DETAILED DISCLOSURE OF THE INVENTION

The Coating Composition

As mentioned above, the present invention provides a fouling control coating composition comprising a polysiloxane-based binder system 0.01-20%, e.g. 0.05-10%, by dry weight of one or more hydrophilic-modified polysiloxanes, and one or more biocides.

Hydrophilic-Modified Polysiloxane

Hydrophilic-modified polysiloxanes are widely used as surfactants and emulsifiers due to the content of both hydrophilic and lipophilic groups in the same molecule.

Means to obtain the hydrophilic character include modification of the polysiloxane backbone by the addition of non-ionic oligomeric or polymeric groups which can be charge-polarized and/or capable of hydrogen bonding, enhancing their interaction with polar solvents, in particular with water, or with other polar oligomeric or polymeric groups. Examples of these groups include, amides (e.g. poly(vinyl pyrrolidone), poly[N-(2-hydroxypropyl)methacrylamide], poly(N,N-dimethacrylamide)), acids (e.g. poly (acrylic acid)), alcohols (e.g. poly(glycerol), polyHEMA, polysaccharides), ketones (polyketones), aldehydes (e.g. poly(aldehyde guluronate), amines (e.g. polyvinylamine), esters (e.g. polycaprolactones, poly(vinyl acetate), polyacrylates), ethers (e.g. polyoxyalkylenes like polyethylene glycol, polypropylene glycol), imides (e.g. poly(2-methyl-2-oxazoline)), etc., including copolymers of the foregoing Preferably the hydrophilicity is obtained by modification with polyoxyalkylene groups.

It should of course be understood that the hydrophilic oligomers/polymers with which the polysiloxane component(s) are modified are of non-silicon origin.

Preferably, the above-mentioned "oligomers" and "polymers" include at least 3 repeating units, such as at least 5 repeating units. In many interesting embodiments, the oligomers or polymers include 5-1,000 repeating units, such as 5-200, or 8-150, or 10-100 repeating units.

In some preferred embodiments, the hydrophilic groups (i.e. oligomeric or polymeric groups) have a number average molecular weight ($M_n$) in the range of 100-50,000 g/mol, such as in the range of 200-30,000 g/mol, in particular in the range of 300-20,000 g/mol, or in the range of 400-10,000 g/mol.

In the present description with claims, the term "hydrophilic-modified" in the context of "hydrophilic-modified polysiloxane" is intended to mean that the oligomeric or polymeric groups with which the polysiloxane is modified, in themselves (i.e. as discrete molecules) have a solubility of at least 1% (w/w) in demineralised water at 25° C.

Of particular interest are those hydrophilic-modified polysiloxanes in which the relative weight of the hydrophilic moieties is 1% or more of the total weight (e.g. 1-90%), such as 5% or more (e.g. 5-80%), in particular 10% or more (e.g. 10-70%) of the total weight of the hydrophilic-modified polysiloxane.

The function of the hydrophilic-modified polysiloxane is to facilitate the dissolution and transport of the biocide to the surface. Potentially, the hydrated layer formed at the coating-water interphase will also aid in retaining the biocide at the surface, hence allowing the coating to exert its fouling deterrent activity for extended exposure intervals. The hydrophilic-modified polysiloxane does not contain groups that can react with the binder or the cross-linker (if present), hence the hydrophilic-modified polysiloxane is intended to be non-reactive, in particular with respect to the binder components.

The ways to control the leach rate include the molecule size of the hydrophilic-modified polysiloxane, the hydrophilicity and the miscibility with the binder. A very small molecule tends to allow a high leach rate of the biocide, while too large a molecule may not allow the leaching of the biocide to be of the desired rate. It is additionally hypothesized that the ability of the hydrophilic polysiloxanes to form a hydrated layer at the coating-water interphase is also important for this invention. In this respect, the diffusion rates of the hydrophilic polysiloxanes in the paint matrix, their relative partitioning between polysiloxane matrix and water, the hydrophilic/hydrophobic balance, their interaction with the chosen biocide(s), and the hydration capacity of the hydrophilic substituents influence the final performance.

Hence, in a preferred embodiment, the hydrophilic-modified polysiloxane has a number average molecular weight ($M_n$) in the range of 100-100,000 g/mol, such as in the range of 250-75,000 g/mol, in particular in the range of 500-50,000 g/mol.

It is also preferred if the hydrophilic-modified polysiloxane has a viscosity in the range of 10-20,000 mPa·s, such as in the range of 20-10,000 mPa·s, in particular in the range of 40-5,000 mPa·s.

In the same way, a high hydrophilicity, for example due to a high concentration of hydrophilic groups such as polyethylene oxide in the molecule, could lead to an early depletion of the biocide(s) due to a high leaching rate. A combination of hydrophilic-modified polysiloxanes with different molecular weights and/or hydrophilicity may be utilized to control the leaching of the biocide.

The hydrophilic-modified polysiloxanes are devoid of any silicon-reactive groups such as Si—OH groups, hydrolysable groups such as Si—OR (alkoxy) groups, etc., so as to avoid reaction with constituents of the polysiloxane-based binder system. Otherwise the hydrophilic-modified polysiloxane may be completely integrated into the polysiloxane binder network, which is undesirable for the purpose of obtaining the technical effect on which the present invention relies.

In one currently preferred embodiment, the hydrophilic-modified polysiloxane is a poly(oxyalkylene)-modified polysiloxane.

In one variant hereof, the poly(oxyalkylene)-modified polysiloxane is a polysiloxane having grafted thereto poly(oxyalkylene) chains. An illustrative example of the structure of such hydrophilic-modified polysiloxanes is formula (A):

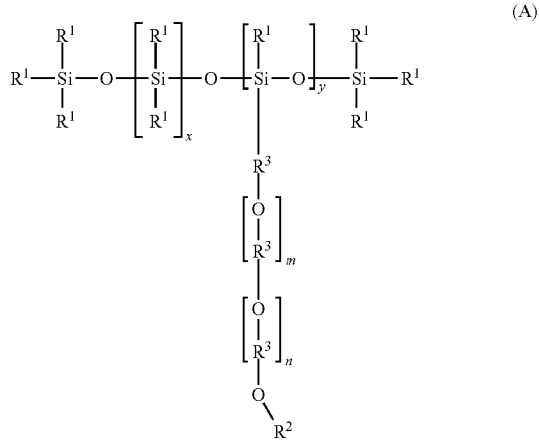

wherein
each $R^1$ is independently selected from $C_{1-5}$-alkyl (including linear or branched hydrocarbon groups) and aryl (e.g. phenyl (—$C_6H_5$)), in particular methyl;
each $R^2$ is independently selected from —H, $C_{1-4}$-alkyl (e.g. —$CH_3$, —$CH_2CH_3$, —$CH_2CH_2CH_3$, —$CH(CH_3)_2$, —$CH_2CH_2CH_2CH_3$), phenyl (—$C_6H_5$), and $C_{1-4}$-alkylcarbonyl (e.g. —C(=O)$CH_3$, —C(=O)$CH_2CH_3$ and —C(=O)$CH_2CH_2CH_3$), in particular —H and methyl;
each $R^3$ is independently selected from $C_{2-5}$-alkylene (e.g. —$CH_2CH_2$—, —$CH_2CH(CH_3)$—, —$CH_2CH_2CH_2CH_2$—, —$CH_2CH(CH_2CH_3)$—), arylene (e.g. 1,4-phenylene) and $C_{2-5}$-alkylene substituted with aryl (e.g. 1-phenyl ethylene), in particular from $C_{2-5}$-alkylene such as —$CH_2CH_2$— and —$CH_2CH(CH_3)$—);
x is 0-2000, y is 1-100 and x+y is 1-2000; and
n is 0-50, m is 0-50 and m+n is 1-50.

Commercially available hydrophilic-modified polysiloxanes of this type are DC5103 (Dow Corning), DC Q2-5097 (Dow Corning), and DC193 (Dow Corning).

In another variant hereof, the poly(oxyalkylene)-modified polysiloxane is a polysiloxane having incorporated in the backbone thereof poly(oxyalkylene) chains. An illustrative example of the structure of such hydrophilic-modified polysiloxanes is formula (B):

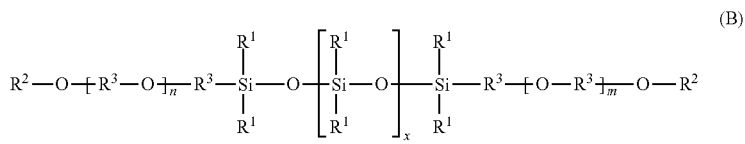

(B)

wherein
each $R^1$ is independently selected from $C_{1-5}$-alkyl (including linear or branched hydrocarbon groups) and aryl (e.g. phenyl (—$C_6H_5$)), in particular methyl;
each $R^2$ is independently selected from —H, $C_{1-4}$-alkyl (e.g. —$CH_3$, —$CH_2CH_3$, —$CH_2CH_2CH_3$, —$CH(CH_3)_2$, —$CH_2CH_2CH_2CH_3$), phenyl (—$C_6H_5$), and $C_{1-4}$-alkylcarbonyl (e.g. —C(=O)$CH_3$, —C(=O)$CH_2CH_3$ and —C(=O)$CH_2CH_2CH_3$), in particular —H and methyl;
each $R^3$ is independently selected from $C_{2-5}$-alkylene (e.g. —$CH_2CH_2$—, —$CH_2CH(CH_3)$—, —$CH_2CH_2CH_2$—, —$CH_2CH_2CH_2CH_2$—, —$CH_2CH(CH_2CH_3)$—), arylene (e.g. 1,4-phenylene) and $C_{2-5}$-alkylene substituted with aryl (e.g. 1-phenyl ethylene), in particular from $C_{2-5}$-alkylene such as —$CH_2CH_2$— and —$CH_2CH(CH_3)$—);
x is 0-2500; and
n is 0-50, m is 0-50 and m+n is 1-50.

Commercially available hydrophilic-modified polysiloxanes of this type are DC 2-8692 (Dow Corning, DC Q4-3669 (Dow Corning), and DC Q4-3667 (Dow Corning).

In still another variant hereof, the poly(oxyalkylene)-modified polysiloxane is a polysiloxane having incorporated in the backbone thereof polyoxyalkylene chains and having grafted thereto polyoxyalkylene chains. An illustrative example of the structure of such hydrophilic-modified polysiloxanes is formula (C):

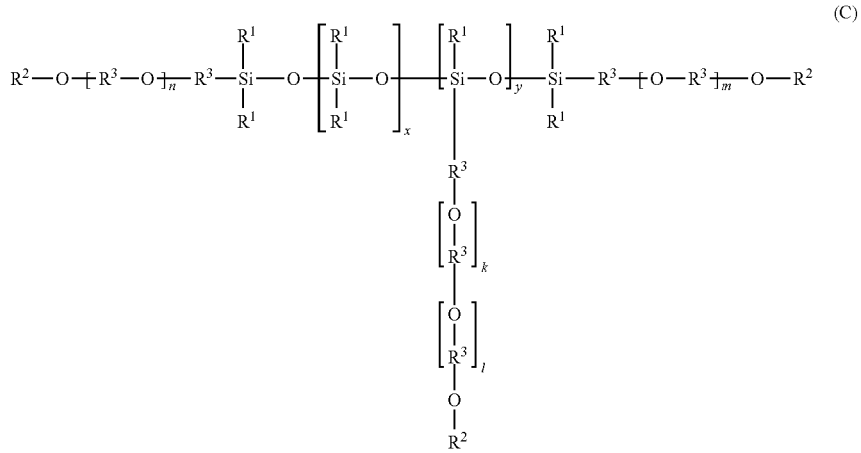

(C)

wherein
each $R^1$ is independently selected from $C_{1-5}$-alkyl (including linear or branched hydrocarbon groups) and aryl (e.g. phenyl (—$C_6H_5$)), in particular methyl;

each $R^2$ is independently selected from —H, $C_{1-4}$-alkyl (e.g. —$CH_3$, —$CH_2CH_3$, —$CH_2CH_2CH_3$, —$CH(CH_3)_2$, —$CH_2CH_2CH_2CH_3$), phenyl (—$C_6H_5$), and $C_{1-4}$-alkylcarbonyl (e.g. —C(=O)$CH_3$, —C(=O)$CH_2CH_3$ and —C(=O)$CH_2CH_2CH_3$), in particular —H and methyl;

each $R^3$ is independently selected from $C_{2-5}$-alkylene (e.g. —$CH_2CH_2$—, —$CH_2CH(CH_3)$—, —$CH_2CH_2CH_2$—, —$CH_2CH_2CH_2CH_2$—, —$CH_2CH(CH_2CH_3)$—), arylene (e.g. 1,4-phenylene) and $C_{2-5}$-alkylene substituted with aryl (e.g. 1-phenyl ethylene), in particular from $C_{2-5}$-alkylene such as —$CH_2CH_2$— and —$CH_2CH(CH_3)$—);

x is 0-2000, y is 1-100 and x+y is 1-2000;
k is 0-50, l is 0-50 and k+l is 1-50; and
n is 0-50, m is 0-50 and m+n is 1-50.

In the above structures (A), (B) and (C), the groups —$CH_2CH(CH_3)$—, —$CH_2CH(CH_2CH_3)$—, etc. may be present in any of the two possible orientations. Similarly, it should be understood that the segments present x and y times typically are randomly distributed in the polysiloxane structure.

In these embodiments and variants, the poly(oxyalkylene) is preferably selected from polyoxyethylene, polyoxypropylene and poly(oxyethylene-co-oxypropylene), which sometimes are referred to as polyethylene glycol, polypropylene glycol and poly(ethylene glycol-co-propylene glycol). Hence, in the above structures (A), (B) and (C), each $R^3$ linking two oxygen atoms is preferably selected from —$CH_2CH_2$— and —$CH_2CH(CH_3)$—, whereas each $R^3$ linking a silicon atom and an oxygen atom preferably is selected from $C_{2-5}$-alkyl.

In some embodiments of the above structures (A), (B) and (C), $R^2$ is preferably not hydrogen. Other examples of hydrophilic-modified polysiloxanes are polysiloxanes modified with carbinol groups or N-pyrrolidone carboxylate copolymers or polyglycerin. It should be understood that the one or more hydrophilic-modified polysiloxanes may be of different types, e.g. two or more of the types described above.

Commercially available examples of hydrophilic-modified polysiloxanes are CMS-222 and YBD-125, both ex. Gelest, USA, and KF-6100 and KF-6104, both ex. Shin-Etsu, Japan.

In some interesting embodiments, the hydrophilic-modified polysiloxane is a hydrophilic polysiloxane.

The term "hydrophilic polysiloxane" is intended to mean that the polysiloxane has been designed so as to be relatively more hydrophilic than a corresponding straight-chain methyl-terminated polysiloxane (i.e. polydimethylsiloxane; PDMS) having the same number of silicon atoms. The relative hydrophilicity is preferably determined in accordance with the Hydrophilicity Test described in the Experimental section.

The one or more hydrophilic-modified polysiloxanes are included in the coating composition in an amount of 0.01-20%, e.g. 0.05-10%, by dry weight. In certain embodiments, the one or more hydrophilic-modified polysiloxanes constitutes 0.05-7% by dry weight, e.g. 0.1-5% by dry weight, in particular 0.5-3% by dry weight, of the coating composition. In certain other embodiments, the one or more hydrophilic-modified polysiloxanes constitutes 1-10% by dry weight, e.g. 2-9% by dry weight, in particular 2-7% by dry weight, or 3-7% by dry weight, or 3-5% by dry weight, or 4-8% by dry weight, of the coating composition.

Biocides

The coating composition also includes a biocide.

In the present context, the term "biocide" is intended to mean an active substance intended to destroy, deter, render harmless, prevent the action of, or otherwise exert a controlling effect on any harmful organism by chemical or biological means.

Illustrative examples of biocides are those selected from metallo-dithiocarbamates such as bis(dimethyldithiocarbamato)zinc, ethylene-bis(dithiocarbamato)zinc, ethylene-bis(dithiocarbamato)manganese, and complexes between these; bis(1-hydroxy-2(1H)-pyridinethionato-O,S)-copper; copper acrylate; bis(1-hydroxy-2(1H)-pyridinethionato-O,S)-zinc; phenyl(bispyridyl)-bismuth dichloride; metal biocides such as copper(I)oxide, cuprous oxide, metallic copper, copper metal alloys such as copper-nickel alloys; metal salts such as cuprous thiocyanate, basic copper carbonate, copper hydroxide, barium metaborate, and copper sulphide; heterocyclic nitrogen compounds such as 3a,4,7,7a-tetrahydro-2-((trichloromethyl)-thio)-1H-isoindole-1,3(2H)-dione, pyridine-triphenylborane, 1-(2,4,6-trichlorophenyl)-1H-pyrrole-2,5-dione, 2,3,5,6-tetrachloro-4-(methylsulfonyl)-pyridine, 2-methylthio-4-tert-butylamino-6-cyclopropylamine-s-triazin, and quinoline derivatives; heterocyclic sulfur compounds such as 2-(4-thiazolyl)benzimidazole, 4,5-dichloro-2-n-octyl-4-isothiazolin-3-one, 4,5-dichloro-2-octyl-3(2H)-isothiazoline (Sea-Nine®-211N), 1,2-benzisothiazolin-3-one, and 2-(thiocyanatomethylthio)-benzothiazole; urea derivatives such as N-(1,3-bis (hydroxymethyl)-2,5-dioxo-4-imidazolidinyl)-N,N'-bis (hydroxymethyl)urea, and N-(3,4-dichlorophenyl)-N,N-dimethylurea, N,N-dimethylchlorophenylurea; amides or imides of carboxylic acids; sulfonic acids and of sulfenic acids such as 2,4,6-trichlorophenyl maleimide, 1,1-dichloro-N-((dimethylamino)sulfonyl)-1-fluoro-N-(4-methylphenyl)-methanesulfenamide, 2,2-dibromo-3-nitrilo-propionamide, N-(fluorodichloromethylthio)-phthalimide, N,N-dimethyl-N'-phenyl-N'-(fluorodichloromethylthio)-sulfamide, and N-methylol formamide; salts or esters of carboxylic acids such as 2-((3-iodo-2-propynyl)oxy)-ethanol phenylcarbamate and N,N-didecyl-N-methyl-poly(oxyethyl)ammonium propionate; amines such as dehydroabiethylamines and cocodimethylamine; substituted methane such as di(2-hydroxy-ethoxy)methane, 5,5'-dichloro-2,2'-dihydroxydiphenylmethane, and methylene-bisthiocyanate; substituted benzene such as 2,4,5,6-tetrachloro-1,3-benzenedicarbonitrile, 1,1-dichloro-N-((dimethylamino)-sulfonyl)-1-fluoro-N-phenylmethanesulfenamide, and 1-((diiodomethyl)sulfonyl)-4-methyl-benzene; tetraalkyl phosphonium halogenides such as tri-n-butyltetradecyl phosphonium chloride; guanidine derivatives such as n-dodecylguanidine hydrochloride; disulfides such as bis-(dimethylthiocarbamoyl)-disulfide, tetramethylthiuram disulfide; imidazole containing compound, such as medetomidine; 2-(p-chlorophenyl)-3-cyano-4-bromo-5-trifluoromethyl pyrrole and mixtures thereof.

Presently, it is preferred that the biocide does not comprise tin.

Currently preferred biocides are those selected from the group consisting of 2,4,5,6-tetrachloroisophtalonitrile (Chlorothalonil), copper thiocyanate (cuprous sulfocyanate), N-dichlorofluoromethylthio-N',N'-dimethyl-N-phenylsulfamide (Dichlofluanid), 3-(3,4-dichlorophenyl)-1,1-dimethylurea (Diuron), 4-bromo-2-(4-chlorophenyl)-5-(trifluoromethyl)-1H-pyrrole-3-carbonitrile, (2-(p-chlorophenyl)-3-cyano-4-bromo-5-trifluoromethyl pyrrole; Tralopyril), $N^2$-tert-butyl-$N^4$-cyclopropyl-6-methylthio-1,3,5-triazine-2,4-diamine (Cybutryne), (RS)-4-[1-(2,3-dimethylphenyl)ethyl]-3H-imidazole (Medetomidine), 4,5-dichloro-2-n-octyl-4-isothiazolin-3-one (DCOIT, Sea-Nine® 211N), dichlor-N-((dimethylamino)sulfonyl)fluor-N-(p-tolyl)methansulfenamid (Tolylfluanid), 2-(thiocyanomethylthio)-1,3-benzothiazole ((2-benzothiazolylthio)methyl thiocyanate; TCMTB), triphenylborane pyridine (TPBP); bis(1-hydroxy-2(1H)-pyridinethionato-O,S)-(T-4) zinc (zinc pyridinethione; Zinc Pyrithione), bis(1-hydroxy-2(1H)-pyridinethionato-O,S)-T-4) copper (copper pyridinethione; Copper Pyrithione), zinc ethylene-1,2-bis-dithiocarbamate (zinc-ethylene-N—N'-dithiocarbamate; Zineb) and diiodomethyl-p-tolylsulfone; Amical 48. Preferably at least one biocide is selected from the above list.

In a particularly preferred embodiment, the biocides are preferably selected among biocides which are effective against soft fouling such as slime and algae. Examples of such biocides are 3-(3,4-dichlorophenyl)-1,1-dimethylurea (Diuron), $N^2$-tert-butyl-$N^4$-cyclopropyl-6-methylthio-1,3,5-triazine-2,4-diamine (Cybutryne), 4,5-dichloro-2-n-octyl-4-isothiazolin-3-one (DCOIT, Sea-Nine® 211N), bis(1-hydroxy-2(1H)-pyridinethionato-O,S)-(T-4) zinc (zinc pyridinethione; Zinc Pyrithione), bis(1-hydroxy-2(1H)-pyridinethionato-O,S)-T-4) copper (copper pyridinethione; Copper Pyrithione) and zinc ethylene-1,2-bis-dithiocarbamate (zinc-ethylene-N—N'-dithiocarbamate; Zineb).

In a further particularly preferred embodiment, the biocide is an organic biocide, such as a pyrithione complex, such as zinc pyrithione. Organic biocides are those either fully or in part being of organic origin.

As detailed in U.S. Pat. No. 7,377,968, in those instances in which the biocide is depleted rapidly from the film due to e.g. a high water solubility or a high level of immiscibility with the matrix composition, it can be advantageous to add one or more of the biocide(s) in encapsulated form as a means of controlling the biocide dosage and extending the effective lifetime in the film. Encapsulated biocides can also be added if the free biocide alters the properties of the polysiloxane matrix in a way that is detrimental for its use as antifouling coatings (e.g. mechanical integrity, drying times, etc.)

In a particularly preferred embodiment, the biocide is encapsulated 4,5-dichloro-2-n-octyl-4-isothiazolin-3-one (DCOIT, Sea-Nine® CR2).

In another particularly preferred embodiment, the biocide is selected from zinc pyrithione, copper pyrithione, and 4,5-dichloro-2-n-octyl-4-isothiazolin-3-one (DCOIT, Sea-Nine® 211N).

The biocide preferably has a solubility in the range of 0-20 mg/L, such as 0.00001-20 mg/L, in water at 25° C.

The biocide typically constitutes 0.1-10% by dry weight, e.g. 0.5-8% by dry weight, in particular 1-6% by dry weight, of the coating composition.

The relative weight ratio between the one or more hydrophilic-modified polysiloxanes and the one or more biocides is typically in the range of 1:0.05 to 1:1000, e.g. 1:0.1 to 1:120, such as 1:0.1 to 1:10, or 1:0.15 to 1:8, in particular 1:0.2 to 1:6, or 1:0.2 to 1:5, or 1:0.25 to 1:4, especially 1:0.3 to 1:3.

Polysiloxane-Based Binder System

The fouling control coating composition of the invention has included therein a polysiloxane-based binder system. The binder system forms a cross-linked matrix which includes the biocide(s) and the hydrophilic-modified polysiloxane as well as other constituents such as solvents, additives, pigments, fillers, etc.

The polysiloxane based binder is a functional organopolysiloxane, with terminal and/or pendant functionality. The terminal functionality is preferred. The functionality can either be hydrolysable groups, such as for example alkoxy groups, ketoxime groups or silanol groups. A minimum of two reactive groups per molecule is preferred. If the molecule contains only two reactive groups, for example silanol groups, it may be necessary to use an additional reactant, a cross-linker, to obtain the desired cross-link density. The cross-linker can for example be an alkoxy silane such as methyltrimethoxysilane, but a wide range of useful silanes are available as will be described further on. The silane can be used as it is or as hydrolysation-condensation products of same. Although condensation cure is much preferred, the functionality of the organopolysiloxane is not limited to a condensation cure. If so desired, other types of curing can be utilized, for example amine/epoxy either alone or in combination with a condensation reaction. In such cases, the organopolysiloxane can have terminal groups of epoxy or amine and pendant hydrolysable groups, for example with alkoxyfunctionality.

In some embodiments, the fouling control coating composition including the polysiloxane-based binder system may be a reaction-curable composition or a moisture-curable composition as will be evident for the person skilled in the art. Examples hereof are a two-component condensation curing composition based on a hydroxyl-reactive polydiorganosiloxane and a silane with hydrolysable groups, or a one-component moisture-curable composition based on a polydiorganosiloxane with alkoxy or other hydrolysable reactivity.

In one embodiment, the binder phase comprises (i) a binder and (ii) a cross-linking agent of which the binder (i) should include hydrolysable groups or other reactive groups so as to participate in the formation of the matrix.

The binder (i) typically constitutes 20-90% by dry weight of the coating composition, and is e.g. a curable diorganopolysiloxane represented by a general formula (1) shown below:

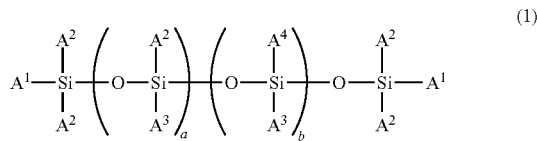

wherein each $A^1$ is independently selected from a hydroxyl group, a hydrolysable group and another functional group, such as amine or epoxy;

each $A^2$ is independently selected from alkyl, aryl, alkenyl and a hydrolysable group;

each $A^3$ and $A^4$ is independently selected from alkyl and aryl alkenyl;

a=1-25,000, b=1-2,500 and a+b is at least 30;

The binders can be used alone or in combination. In a preferred embodiment only one generic type of the binder is used.

The cross-linking agent (ii) preferably constitutes 0-10% by dry weight of the coating composition and is, e.g., an organosilicon compound represented by the general formula (2) shown below, a partial hydrolysis-condensation product thereof, or a mixture of the two:

wherein, each R represents, independently, an unsubstituted or substituted monovalent hydrocarbon group of 1 to 6 carbon atoms, each X represents, independently, a hydrolysable group, and a represents an integer from 0 to 2, such as from 0 to 1.

The compound outlined in formula (2) acts as a cross-linker for the binder (i). The composition can be formulated as a one component curable RTV (room-temperature vulcanizable) by admixing the binder (i) and the cross-linking agent (ii). If the reactivity on the terminal Si-group of the binder (i) consist of readily hydrolysable groups, such as dimethoxy or trimethoxy, a separate cross-linker is usually not necessary to cure the film.

Preferred cross-linkers are those selected from tetraethoxysilane; vinyltris(methylethyloximo)silane; methyltris(methylethyloximo)silane; vinyltrimethoxysilane; methyltrimethoxysilane and vinyltriisopropenoxysilane; as well as hydrolysis-condensation products of the same.

In some interesting embodiments, the polysiloxane-based binder comprises a polydimethylsiloxane-based binder.

The polysiloxane-based binder system typically constitutes at least 40% by dry weight, in particular 50-90% by dry weight, of the coating composition.

Catalyst

The coating composition may further comprise a condensation catalyst to accelerate the cross-linking. Examples of suitable catalysts include organometal- and metal salts of organic carboxylic acids, such as dibutyl tin dilaurate, dibutyl tin diacetate, dibutyl tin dioctoate, dibutyl tin 2-ethylhexoate, dioctyl tin dilaurate, dioctyl tin diacetate, dioctyl tin dioctoate, dioctyl tin 2-ethylhexoate, dioctyltin di neodecanoate, tin naphthenate, tin butyrate, tin oleate, tin caprylate, iron 2-ethylhexoate, lead 2-ethyloctoate, cobalt-2-ethylhexoate, manganese 2-ethylhexoate, zinc 2-ethylhexoate, zinc naphthenate, zinc stearate, cobalt naphthenate and titanium naphtenate; titanate- and zirconate esters such as tetrabutyl titanate, tetrakis(2-ethylhexyl)titanate, triethanolamine titanate, tetra(isopropenyloxy)titanate, titanium tetrabutanolate, titanium tatrapropanolate; titanium tetraisopropanolate, zirconium tetrapropanolate, zirconium tetrabutanolate; chelated titanates such as diisopropyl bis(acetylacetonyl)titanate. Further condensation catalysts are described in WO 2008/132196 and US 2004/006190.

The catalyst may be used alone or as combination of two or more catalysts. The amount of catalyst to be used is depending on the reactivity of the catalyst and the cross-linker(s) and desired drying time. In a preferred embodiment the catalyst concentration is between 0.01-10% by weight of the total combined amount of the binder (i) and cross-linking agent (ii).

Solvents, Additives, Pigments and Fillers

The coating composition may further comprise solvents and additives.

Examples of solvents are aliphatic, cycloaliphatic and aromatic hydrocarbons such as white spirit, cyclohexane, toluene, xylene and naphtha solvent, esters such as methoxypropyl acetate, n-butyl acetate and 2-ethoxyethyl acetate; octamethyltrisiloxane, and mixtures thereof.

The solvents, if any, typically constitute 5-50% by volume of the coating composition.

Examples of additives are:

(i) non-reactive fluids such as organopolysiloxanes; for example polydimethylsiloxane, methylphenyl polysiloxane; petroleum oils and combinations thereof;

(ii) surfactants such as derivatives of propylene oxide or ethylene oxide such as alkylphenolethylene oxide condensates (alkylphenol ethoxylates); ethoxylated monoethanolamides of unsaturated fatty acids such as ethoxylated monoethanolamides of linoleic acid; sodium dodecyl sulfate; and soya lecithin;

(iii) wetting agents and dispersants such as those described in M. Ash and I. Ash, "Handbook of Paint and Coating Raw Materials, Vol. 1", 1996, Gower Publ. Ltd., Great Britain, pp 821-823 and 849-851;

(iv) thickeners and anti-settling agents such as colloidal silica, hydrated aluminum silicate (bentonite), aluminiumtristearate, aluminiummonostearate, xanthan gum, chrysotile, pyrogenic silica, hydrogenated castor oil, organomodified clays, polyamide waxes and polyethylene waxes; and (v) dyes such as 1,4-bis(butylamino)anthraquinone and other anthraquinone derivatives; toluidine dyes, etc.

Any additives typically constitute 0-30%, such as 0-15%, by dry weight of the coating composition.

Furthermore, the coating composition may comprise pigments and fillers.

Pigments and fillers are in the present context viewed in conjunction as constituents that may be added to the coating composition with only limited implications on the adhesion properties. "Pigments" are normally characterised in that they render the final paint coating non-transparent and non-translucent, whereas "fillers" normally are characterised in that they do not render the paint non-translucent and therefore do not contribute significantly to hide any material below the coating.

Examples of pigments are grades of titanium dioxide, red iron oxide, zinc oxide, carbon black, graphite, yellow iron oxide, red molybdate, yellow molybdate, zinc sulfide, antimony oxide, sodium aluminum sulfosilicates, quinacridones, phthalocyanine blue, phthalocyanine green, black iron oxide, indanthrone blue, cobalt aluminum oxide, carbazole dioxazine, chromium oxide, isoindoline orange, bisacetoacet-o-tolidiole, benzimidazolon, quinaphtalone yellow, isoindoline yellow, tetrachloroisoindolinone, quinophthalone yellow.

Examples of fillers are calcium carbonate such as dolomite, talc, mica, feldspar, barium sulfate, kaolin, nephelin, silica, perlite, magnesium oxide, and quartz flour, etc. Fillers (and pigments) may also be added in the form of nanotubes or fibres, thus, apart from the before-mentioned examples of fillers, the coating composition may also comprise fibres, e.g. those generally and specifically described in WO 00/77102 which is hereby incorporated by reference.

Any pigments and/or fillers typically constitute 0-60%, such as 0-50%, preferably 5-45%, such as 5-40% or 5-35%, by dry weight of the coating composition.

With the aim of facilitating easy application of the coating composition (e.g. by spray, brush or roller application techniques), the coating composition typically has a viscosity in the range of 25-25,000 mPa·s, such as in the range of 150-15,000 mPa·s, in particular in the range of 200-4000 mPa·s.

Preparation of the Coating Composition

The coating composition may be prepared by any suitable technique that is commonly used within the field of paint production. Thus, the various constituents may be mixed together utilizing a mixer, a high speed disperser, a ball mill, a pearl mill, a grinder, a three-roll mill etc. The coating compositions are typically prepared and shipped as two- or three-component systems that should be combined and thoroughly mixed immediately prior to use. The paints according to the invention may be filtrated using bag filters, patron filters, wire gap filters, wedge wire filters, metal edge filters, EGLM turnoclean filters (ex. Cuno), DELTA strain filters (ex. Cuno), and Jenag Strainer filters (ex. Jenag), or by vibration filtration. An example of a suitable preparation method is described in the Examples.

The coating composition to be used in the method of the invention is typically prepared by mixing two or more components e.g. two pre-mixtures, one pre-mixture comprising the one or more reactive polysiloxane binders and one pre-mixture comprising the one or more cross-linking agents. It should be understood that when reference is made to the coating composition, it is the mixed coating composition ready to be applied. Furthermore, all amounts stated as % by dry weight of the coating composition should be understood as % by dry weight of the mixed paint composition ready to be applied, i.e. the weight apart from the solvents (if any).

Specific Embodiments of the Coating Composition

In one preferred embodiment the top coat comprises:
(i) 40-70% by wet weight of the total top coat composition of a silanol-terminated polydiorganosiloxane and a cross-linker;
(ii) 0.1-10%, such as 0.5-8%, by wet weight of the total top coat composition of one or more biocides, preferably selected from organic biocides; and
(iii) 0.1-10%, such as 0.5-8%, by wet weight of the total top coat composition of one or more hydrophilic-modified polysiloxanes selected from the poly(oxyalkylene)-modified polysiloxanes (such as corresponding to the structures presented hereinabove).

In another preferred embodiment the top coat comprises:
(i) 40-70% by wet weight of the total top coat composition of a silanol-terminated polydiorganosiloxane and a cross-linker;
(ii) 0.5-8% by wet weight of the total top coat composition of one or more organic biocides; and
(iii) 0.5-8%, by wet weight of the total top coat composition of one or more hydrophilic-modified polysiloxanes selected from the poly(oxyalkylene)-modified polysiloxanes (such as corresponding to the structures presented hereinabove), wherein the weight ratio between the one or more hydrophilic-modified polysiloxanes and the one or more biocides is in the range 1:0.2 to 1:6. In yet another preferred embodiment, the binder in the preferred embodiments above mentioned, has been pre-reacted in a moisture free environment to form a single component formulation by admixing 100 parts by weight of silanol terminated polydiorganosiloxane with 0.5-30 parts by weight of hydrolysable cross-linker, such as vinyltrimethoxysilane.

Application of the Coating Composition

The coating composition of the invention is typically applied to at least, a part of the surface of a substrate.

The term "applying" is used in its normal meaning within the paint industry. Thus, "applying" is conducted by means of any conventional means, e.g. by brush, by roller, by spraying, by dipping, etc. The commercially most interesting way of "applying" the coating composition is by spraying. Spraying is effected by means of conventional spraying equipment known to the person skilled in the art. The coating is typically applied in a dry film thickness of 50-600 μm, such as 50-500 μm, e.g. 75-400 μm.

The term "at least a part of the surface of a substrate" refers to the fact that the coating composition may be applied to any fraction of the surface. For many applications, the coating composition is at least applied to the part of the substrate (e.g. a vessel) where the surface (e.g. the ship's hull) may come in contact with water, e.g. sea-water.

The term "substrate" is intended to mean a solid material onto which the coating composition is applied. The substrate typically comprises a metal such as steel, iron, aluminum, or glass-fibre reinforced polyester. In the most interesting embodiments, the substrate is a metal substrate, in particular a steel substrate. In an alternative embodiment, the substrate is a glass-fibre reinforced polyester substrate. In some embodiments, the substrate is at least a part of the outermost surface of a marine structure.

The term "surface" is used in its normal sense, and refers to the exterior boundary of an object. Particular examples of such surfaces are the surface of marine structures, such as vessels (including but not limited to boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, water-power installations and structures, underwater oil well structures, nets and other aquatic culture installations, and buoys, etc.

The surface of the substrate may either be the "native" surface (e.g. the steel surface). However, the substrate is typically coated, e.g. with an anticorrosive coating and/or a tie coat, so that the surface of the substrate is constituted by such a coating. When present, the (anticorrosive and/or tie) coating is typically applied in a total dry film thickness of 100-600 µm, such as 150-450 µm, e.g. 200-400 µm. Alternatively, the substrate may carry a paint coat, e.g. a worn-out fouling control paint coat, or similar.

In one important embodiment, the substrate is a metal substrate (e.g. a steel substrate) coated with an anticorrosive coating such as an anticorrosive epoxy-based coating, e.g. cured epoxy-based coating, or a shop-primer, e.g. a zinc-rich shop-primer. In another relevant embodiment, the substrate is a glass-fiber reinforced polyester substrate coated with an epoxy primer coating.

A Marine Structure

The present invention also provides a marine structure comprising on at least a part of the outer surface thereof an outermost fouling control coating prepared from a coating composition as defined hereinabove. In particular, at least as part of the outer surface carrying the outermost coating is a submerged part of said structure.

The coating composition, the method of establishing the coating on the substrate surface, and the characteristics of the coating follow the directions given hereinabove.

In one embodiment, the fouling control coating system of the marine structure may consist of an anticorrosive layer, a tie-coat and the fouling control coating as described herein.

In one particular embodiment of the above marine structure, the anticorrosive layer has a total dry film thickness of 100-600 µm, such as 150-450 µm, e.g. 200-400 µm; the tie-coat has a total dry film thickness of 50-500 µm, such as 50-400 µm, e.g. 75-350 µm or 75-300 µm or 75-250 µm; and the fouling control coating has a total dry film thickness of 20-500 µm, such as 20-400 µm, e.g. 50-300 µm.

A further embodiment of the marine structure is that where at least a part of the outermost surface of said structure is coated with a paint system comprising a total dry film thickness of 150-400 µm of an anticorrosive layer of an epoxy-based coating established by application of 1-4, such as 2-4, layers;

a total dry film thickness of 20-400 µm of the tie-coat established by application of 1-2 layers; and a total dry film thickness of 20-400 µm of the fouling control coating established by application of 1-2 layers.

In another embodiment of the above marine structure, the fouling control coating is applied directly on the anticorrosive layer without the use of tie-coat.

Use for Improving the Antifouling Properties of a Polysiloxane Based Coating Composition The invention further relates to the use of the combination of one or more non-reactive hydrophilic-modified polysiloxanes and one or more biocides, wherein the weight ratio between the one or more hydrophilic-modified polysiloxanes and the one or more biocides is in the range 1:0.2 to 1:6, for improving the antifouling properties of a polysiloxane based coating composition. The combination is particularly relevant for improving the antifouling properties against slime and algae.

It should be understood that the types of non-reactive hydrophilic-modified polysiloxanes, the biocides, and the types of suitable polysiloxane based binder systems are as defined further above, just at the amounts and relative proportions of the various ingredients are as defined further above.

General Remarks

Although the present description and claims occasionally refer to a polysiloxane, etc., it should be understood that the coating compositions defined herein may comprise one, two or more types of the individual constituents. In such embodiments, the total amount of the respective constituent should correspond to the amount defined above for the individual constituent.

The "(s)" in the expressions: compound(s), polysiloxane(s), agent(s), etc. indicates that one, two or more types of the individual constituents may be present.

On the other hand, when the expression "one" is used, only one (1) of the respective constituent is present.

EXAMPLE 1

Materials

RF-5000, ex. Shin-Etsu—Japan, silanol-terminated polydimethylsiloxane Xylene from local supplier DC200, ex. Dow Corning—USA, polydimethyl siloxane DC5103, ex. Dow Corning—USA, polyether modified polysiloxane (siloxylated polyether)

DC550, ex. Dow Corning—USA, non-reactive methylphenyl polysiloxane

Zinc Omadine, ex. Arch Chemicals Inc.—Ireland, Zinc Pyrithione

Copper Omadine, ex. Arch Chemical Inc.—Ireland, Copper Pyrithione

Silikat TES 40 WN, ex. Wacker Chemie—Germany, Ethyl silicate

Neostann U-12, ex. Nitto Kasai—Japan, Dibutyltin Dilaurate

Acetylaceton, ex. Wacker Chemie—Germany, 2,4-pentanedione

DC190, ex. Dow Corning—USA, polyether modified polysiloxane

DBE-621, ex. Gelest—USA, Dimethylsiloxane—ethyleneoxide block copolymer

BYK331, ex. BYK—Germany, Polyether modified polydimethylsiloxane

YBD-125, ex. Gelest—USA, Dimethylsiloxane—N-pyrrolidone carboxylate copolymer

CMS-222, ex. Gelest—USA, Carbinol functional PDMS—20% non-siloxane

Sea-Nine 211N, ex. Dow Chemicals—USA, 4,5-dichloro-2-n-octyl-4-isothiazolin-3-one Sea-Nine CR2, ex. Dow Chemicals—USA, encapsulated 4,5-dichloro-2-n-octyl-4-isothiazolin-3-one Bayferrox 130M, ex. Lanxess—Germany, Iron oxide Aerosil R8200, ex. Evonik Industries—Germany, Hexamethyldisilazane treated fumed silica Viscosity In the present application with claims, viscosity is measured at 25° C. in accordance with ISO 2555:1989.

Hydrophilicity—Relative to a PDMS

Polysiloxanes which are truly more hydrophilic than the corresponding polydimethylsiloxane (PDMS) can be identified by one or all of the following tests:

A. Water-Uptake

Due to its inherent hydrophobic properties, PDMS will not take up water. One experimental criterion to identify hydrophilic polysiloxanes is that their hydrophilic content should allow them to take up at least 0.1% of their own weight when immersed to demineralized water. When 99.9 parts by weight of hydrophilic polysiloxane are vigorously mixed with 0.1 parts by weight of demineralized water, the polysiloxane will dissolve, absorb or swell the water resulting in no visible phase separation.

Preparation Method for the Model Paints

Composition A, B, C, D, E:

Part (i) (silanol-terminated polydimethylsiloxane), xylene, (polydimethylsiloxane), silica, (polyamide wax), red iron oxide, (polyether modified polysiloxane), (biocide) were mixed on a Diaf dissolver equipped with an impeller disc (70 mm in diameter) in a 1 L can for 15 minutes at 2000 rpm.

Part (ii) (ethyl silicate, xylene, catalyst, 2,4-pentanedione, (methylphenyl polysiloxane)) were mixed on a Diaf dissolver equipped with an impeller disc (70 mm in diameter) in a 1 L can for 2 minutes at 500 rpm.

Before the application, part (i) and part (ii) are mixed to a homogenous mixture Test Methods Blister Box Test The Blister Box test is used to determine the influence of hydrophilic-modified polysiloxanes (hydrophilic silicone oils) on the stability of the PDMS coating to which they are added.

Preparation of Panels

Steel panels (150×75×15 mm) are coated with 100 μm (dry film thickness, DFT) of a commercial epoxy primer (HEMPADUR Quattro 17634) applied by airless spraying. After 12-48 hrs of drying at room temperature a silicone tie coat (HEMPASIL Nexus 27302) is applied by doctor blade of 300 μm clearance. After 16-30 hrs of drying the top coat paint compositions are applied by Dr. Blade of 400 μm clearance. The panels are dried for 24 hrs before testing in the blister box.

Testing

The panel surface with the coating system is exposed to 40° C., saturated water vapour, at an angle of 15°/60° to the horizontal. The reverse side of the panel is exposed to room temperature. At the selected inspection intervals during and after completion of exposure, adhesion between tie coat/top coat and general condition of the top coat are evaluated.

Evaluation of adhesion between tie coat and top coat is based on the below ranking:

| Adhesion | Ranking Value |
| --- | --- |
| FAIL/POOR | No adhesion/poor adhesion |
| GOOD | Acceptable adhesion |

Panels are exposed for two months and typically checked every week.

Examples of adhesion between the PDMS top coat and Hempasil Nexus tie coat after addition of 5% w/w of hydrophilic-modified polysiloxanes (polyether type) to the PDMS top coat (test results from Blister Box after 3 weeks exposure):

| Hydrophilic-modified polysiloxane (polyether type) | Adhesion |
| --- | --- |
| DC190 (Dow Corning) | GOOD |
| (none) (reference) | GOOD |

Raft Test

Preparation of Panels

An acrylic panel (150×200 mm), sandblasted on one side to facilitate adhesion of the coating, is coated with 100 μm (DFT) of a commercial epoxy (HEMPEL Light Primer 45551) applied by air spraying. After 6-24 hrs of drying at room temperature a tie coat is applied by Dr. Blade of 300 μm clearance. After 16-30 hrs of drying the top coat paint compositions are applied by Dr. Blade of 400 μm clearance. The panels are dried for at least 72 hrs before immersion on the raft.

Testing

Panels are tested at two different locations; Spain and Singapore.

Test Site in Spain

Located in Vilanova in north-eastern Spain. At this test site the panels are immersed into sea water with salinity in the range of 37-38 parts per thousand at an average temperature of 17-18° C.

Test Site in Singapore

At this test site the panels are immersed into sea water with salinity in the range of 29-31 parts per thousand at a temperature in the range of 29-31° C.

Panels are inspected ever 4-12 weeks and evaluated according to the following scale:

| Level | Description |
| --- | --- |
| Excellent | Only slime |
| Good | Algae + Animals <10% |
| Fair | 10%< Algae + Animals <25% |
| Poor | Algae + Animals >25% |

EXAMPLES

All entries in model paints table are in weight unless otherwise stated.

| Model paints | Top coat composition A | Top coat composition B | Top coat composition C |
| --- | --- | --- | --- |
| Part (i) | | | |
| Silanol-terminated polydimethylsiloxane (5000 cSt) | 54.9 | 55.0 | 55.4 |
| Xylene | 21.1 | 21.1 | 21.1 |
| Polydimethyl siloxane 50 cSt | 1.2 | 1.2 | 1.2 |
| Thickeners | 2.1 | 2.1 | 1.7 |
| Pigments | 3.8 | 3.8 | 3.8 |
| Hydrophilic-modified polysiloxane: | | | |
| Polyether modified polysiloxane (DC5103) | 4.8 | 4.8 | 4.8 |
| Biocide: | | | |
| Zinc pyrithione | 4.8 | | 4.8 |
| Copper pyrithione | 0.0 | 4.8 | 0.0 |
| Total part (i) | 92.7 | 92.8 | 92.8 |
| Part (ii) | | | |
| Ethyl silicate | 2.2 | 2.2 | 2.2 |
| Xylene | 3.5 | 3.5 | 3.5 |
| Non-reactive methylphenyl polysiloxane | | | |

-continued

| Model paints | Top coat composition A | Top coat composition B | Top coat composition C |
|---|---|---|---|
| Dibutyltin dilaurate | 0.5 | 0.5 | 0.5 |
| 2,4-pentanedione | 1.1 | 1.1 | 1.1 |
| Total part (ii) | 7.3 | 7.2 | 7.2 |
| Total part (i) and (ii) | 100.0 | 100.0 | 100.0 |
| Performance on raft in Spain (12 months) | EXCELLENT | EXCELLENT | EXCELLENT |
| Performance on raft in Singapore (12 months) | EXCELLENT | EXCELLENT | EXCELLENT |

| Model paints | Top coat composition D (reference) | Top coat composition E (reference) | Top coat composition F (reference) |
|---|---|---|---|
| Part (i) | | | |
| Silanol-terminated polydimethylsiloxane (5000 cSt) | 55.1 | 57.7 | 58.3 |
| Xylene | 21.1 | 22.1 | 22.2 |
| Polydimethyl siloxane 50 cSt | 1.2 | 1.2 | 1.2 |
| Thickeners | 2.1 | 2.2 | 1.8 |
| Pigments | 3.9 | 4.0 | 4.0 |
| Hydrophilic-modified polysiloxane: | | | |
| Polyether modified polysiloxane (DC5103) | | 5.1 | |
| Biocide: | | | |
| Zinc pyrithione | | | |
| Copper pyrithione | 4.8 | | |
| Total part (i) | 88.2 | 92.3 | 87.7 |
| Part (ii) | | | |
| Ethyl silicate | 2.2 | 2.3 | 2.3 |
| Xylene | 3.5 | 3.6 | 3.6 |
| Non-reactive methylphenyl polysiloxane | 4.5 | | 4.8 |
| Dibutyltin dilaurate | 0.5 | 0.5 | 0.5 |
| 2,4-pentanedione | 1.1 | 1.1 | 1.1 |
| Total part (ii) | 11.8 | 7.7 | 12.3 |
| Total part (i) and (ii) | 100.0 | 100.0 | 100.0 |
| Performance on raft in Spain (12 months) | FAIR | FAIR | FAIR |
| Performance on raft in Singapore (12 months) | FAIR | POOR | GOOD |

Comments to Results (Composition A-F):

Some biocides might be more effective against some fouling species than others. Because the fouling species vary from location to location, performance of the top coat composition may also vary. Results are therefore included from both raft locations.

The performance of the top coat compositions with biocides is increased drastically when a hydrophilic-modified polysiloxane such as a non-reactive polyether modified polysiloxane is added (composition A and B) as this secures the biocidal transport through the cross-linked PDMS coating to the surface. Biocides alone or biocides in combination with non-reactive hydrophobic polysiloxanes do not increase the performance of the top coat composition (composition D). It is also found that the use of a non-reactive hydrophilic-modified polysiloxane alone did not provide the advantages of the combination of the non-reactive hydrophilic-modified polysiloxane and the biocide.

| Model paints | Top coat composition G | Top coat composition H | Top coat composition I (reference) |
|---|---|---|---|
| Part (i) | | | |
| Silanol-terminated polydimethylsiloxane (5000 cSt) | 57.2 | 58.6 | 61.0 |
| Xylene | 17.0 | 17.7 | 18.2 |
| Thickeners | 4.7 | 4.8 | 5.0 |
| Pigments | 4.0 | 3.8 | 4.2 |
| Hydrophilic-modified polysiloxane: | | | |
| Polyether modified polysiloxane (DC190) | 3.6 | | 3.7 |
| Polyether modified polysiloxane (DBE-621) | | 2.8 | |
| Biocide: | | | |
| Copper pyrithione | 6.1 | | |
| Zinc pyrithione | | 4.9 | |
| Total part (i) | 92.6 | 92.5 | 92.1 |
| Part (ii) | | | |
| Ethyl silicate | 2.3 | 2.4 | 2.4 |
| Xylene | 3.6 | 3.7 | 3.8 |
| Dibutyltin dilaurate | 0.4 | 0.4 | 0.4 |
| 2,4-pentanedione | 1.1 | 1.0 | 1.,3 |
| Total part (ii) | 7.4 | 7.5 | 7.9 |
| Total part (i) and (ii) | 100.0 | 100.0 | 100.0 |
| Performance on raft in Spain | EXCELLENT (38 weeks) | — | POOR (38 weeks) |
| Performance on raft in Singapore | EXCELLENT (38 weeks) | EXCELLENT (38 weeks) | POOR (38 weeks) |

Comments to Results (Compositions G-I)

Compositions G and H contain biocides, and show improved performance compared to reference (composition I) that only contain the hydrophilic-modified polysiloxane (polyether type).

| Model paints | Top coat composition J | Top coat composition K | Top coat composition L (reference) |
|---|---|---|---|
| Part (i) | | | |
| Silanol-terminated polydimethylsiloxane (5000 cSt) | 59.1 | 59.1 | 63.3 |
| Xylene | 17.6 | 17.6 | 18.9 |
| Thickeners | 4.8 | 4.8 | 5.2 |
| Pigments | 4.1 | 4.1 | 4.4 |
| Hydrophilic-modified polysiloxane | | | |
| N-pyrrolidone carboxylatemodified polysiloxane (YBD-125) | 1.9 | | |
| Carbinol modified polysiloxane (CMS-222) | | 1.9 | |
| Biocide: | | | |
| Zinc pyrithione | 4.8 | 4.8 | |
| Total part (i) | 92.3 | 92.3 | 91.8 |

| Model paints | Top coat composition J | Top coat composition K | Top coat composition L (reference) |
|---|---|---|---|
| Part (ii) | | | |
| Ethyl silicate | 2.4 | 2.4 | 2.5 |
| Xylene | 3.7 | 3.7 | 4.0 |
| Dibutyltin dilaurate | 0.4 | 0.4 | 0.4 |
| 2,4-pentanedione | 1.2 | 1.2 | 1.3 |
| Total part (ii) | 7.7 | 7.7 | 8.2 |
| Total part (i) and (ii) | 100.0 | 100.0 | 100.0 |
| Performance on raft in Spain | — | — | — |
| Performance on raft in Singapore | GOOD (24 weeks) | EXCELLENT (24 weeks) | FAIR (24 weeks) |

Comments to Results (Compositions J, K and L)

It is observed that the examples of hydrophilic, non-PEG modified PDMS compounds used in compositions J and K (YBD-125 and CMS-222) shows an improved performance compared to the biocide free polysiloxane reference (composition L) after 24 weeks of static immersion in Singapore.

| Model paints | Top coat composition M | Top coat composition N (reference) |
|---|---|---|
| Part (i) | | |
| Silanol-terminated polydimethylsiloxane (5000 cSt) | 58.8 | 53.0 |
| Xylene | 17.7 | 16.0 |
| Thickeners | 4.8 | 4.3 |
| Pigments | 3.8 | 3.4 |
| Hydrophilic-modified polysiloxane: | | |
| Polyether modified polysiloxane (BYK-331) | 2.8 | 2.5 |
| Biocide: | | |
| Encapsulated 4,5-dichloro-2-n-octyl-4-isothiazolin-3-one (~91% w) | 4.6 (4.2) | |
| 4,5-dichloro-2-n-octyl-4-isothiazolin-3-one solution (30% w) | | 14.0 (4.2) |
| Total part (i) | 92.5 | 93.2 |
| Part (ii) | | |
| Ethyl silicate | 2.4 | 2.2 |
| Xylene | 3.7 | 3.3 |
| Dibutyltin dilaurate | 0.4 | 0.3 |
| 2,4-pentanedione | 1.0 | 0.9 |
| Total part (ii) | 7.5 | 6.8 |
| Total part (i) and (ii) | 100.0 | 100.0 |
| Performance on raft in Spain | — | — |
| Performance on raft in Singapore | EXCELLENT (11 weeks) | GOOD (11 weeks) |

Comments to Results (Compositions M and N):

Compositions M and N have the same concentration of the pure biocide 4,5-dichloro-2-n-octyl-4-isothiazolin-3-one solution. It is seen that the encapsulated biocide has a better effect than the non-encapsulated biocide in N. Both compositions contained the same hydrophilic modified polysiloxane.

The invention claimed is:

1. A fouling control coating composition comprising:
A) 50-90% by dry weight of the coating composition of a polysiloxane-based binder system consisting of (i) a binder and optionally (ii) a cross-linking agent, wherein the binder (i) constitutes 20-90% by dry weight of the coating composition, and is a curable diorganopolysiloxane represented by general formula (1):

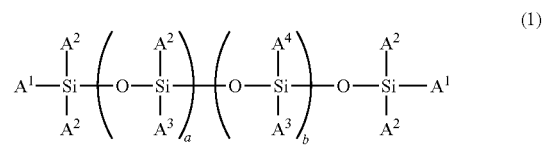

wherein:
each $A^1$ is independently selected from the group consisting of a hydroxyl group and a hydrolysable group;
each $A^2$ is independently selected from the group consisting of an alkyl, aryl, alkenyl and a hydrolysable group;
each $A^3$ and $A^4$ is independently selected from the group consisting of alkyl, aryl, and alkenyl; and
a=1-25,000, b=1-2,500 and a+b is at least 30;
wherein the cross-linking agent, if present, constitutes 0-10% by dry weight of the coating composition;
B) 0 to 35% by dry weight of the coating composition of pigments and/or fillers;
C) 0.01-20% by dry weight of one or more hydrophilic-modified polysiloxanes, wherein the hydrophilic-modified polysiloxanes are selected from poly(oxyalkylene)-modified polysiloxanes, wherein the poly(oxyalkylene) is selected from the group consisting of polyoxyethylene, polyoxypropylene and poly(oxyethylene-co-oxypropylene), and
D) one or more biocides, wherein said one or more biocides are selected from the group consisting of an organic biocide and cuprous oxide;
wherein the weight ratio between the one or more hydrophilic-modified polysiloxanes and the one or more biocides is in the range 1:0.2 to 1:6, and
wherein the one or more hydrophilic-modified polysiloxanes do not contain groups that can react with the binder or any cross-linker.

2. The coating composition according to claim 1, wherein the one or more hydrophilic-modified polysiloxanes constitute 0.05-10% by dry weight of the coating composition.

3. The coating composition according to claim 2, wherein the one or more hydrophilic-modified polysiloxanes constitute 2-7% by dry weight of the coating composition.

4. The coating composition according to claim 1, wherein the one or more biocides constitutes 0.1-10% by dry weight of the coating composition.

5. The coating composition according to claim 1, wherein the one or more biocides are selected from the group consisting of 3-(3,4-dichlorophenyl)-1,1-dimethylurea, $N^2$-tert-butyl-$N^4$-cyclopropyl-6-methylthio-1,3,5-triazine-2,4-diamine, 4,5-dichloro-2-n-octyl-4-isothiazolin-3-one, bis(1-hydroxy-2(1H)-pyridinethionato-O,S)-(T-4) zinc, bis(1-hydroxy-2(1H)-pyridinethionato-O,S)-T-4) copper, zinc ethylene-1,2-bis-dithiocarbamate and cuprous oxide.

6. The coating composition according to claim 1, wherein the one or more biocides are selected from the group consisting of zinc pyrithione, copper pyrithione, and 4,5-dichloro-2-n-octyl-4-isothiazolin-3-one and cuprous oxide.

7. The coating composition according to claim 1, wherein at least one biocide is a pyrithione complex or cuprous oxide.

8. The coating composition according to claim 1, wherein one or more biocides is a pyrithione complex and cuprous oxide.

9. The coating composition according to claim 1, wherein the hydrophilic groups of the one or more hydrophilic-modified polysiloxanes have a number average molecular weight ($M_n$) in the range of 400-10,000 g/mol.

10. The coating composition according to claim 1, wherein the hydrophilic-modified polysiloxane has a number average molecular weight ($M_n$) in the range of 500-50,000 g/mol.

11. The coating composition according to claim 1,
wherein the hydrophilic-modified polysiloxanes constitute 0.05-10% by dry weight of the coating composition,
one or more biocides constitutes 0.1-10% by dry weight of the coating composition,
said coating composition having a viscosity in the range of 200-4,000 mPa·s measured at 25° C. in accordance with ISO 2555:1989, and
said coating composition further comprises pigments and/or fillers in an amount of 0-35% by dry weight of the coating composition.

12. The coating composition according to claim 11, wherein at least one biocide is a pyrithione complex.

13. The coating composition according to claim 1, wherein at least one biocide is a pyrithione complex.

14. The coating composition according to claim 1, wherein said hydrolysable groups in said curable diorganopolysiloxane of general formula (1) are selected from alkoxy groups and ketoxime groups.

15. The coating composition according to claim 1, which comprises:
40-70% by wet weight of the total coating composition of a silanol-terminated polydiorganosiloxane and a cross-linker;
0.1-10% by wet weight of the total coating composition of said one or more biocides; and
0.1-10% by wet weight of the total coating composition of said one or more hydrophilic-modified polysiloxanes selected from poly(oxyalkylene)-modified polysiloxanes.

16. The coating composition according to claim 1, wherein the cross-linking agent is selected from tetraethoxysilane; vinyltris(methylethyloximo)silane; methyltris(methylethyloximo)silane; vinyltrimethoxysilane; methyltrimethoxysilane; vinyltriisopropenoxysilane; and hydrolysis-condensation products of the same.

17. A marine structure comprising on at least a part of the outer surface thereof an outermost coating prepared from a coating composition as defined in claim 1.

18. The structure according to claim 17, wherein at least as part of the outer surface carrying the outermost coating is a submerged part of said structure.

19. The structure according to claim 17, wherein the one or more biocides of the coating composition are selected from the group consisting of 3-(3,4-dichlorophenyl)-1,1-dimethylurea, $N^2$-tert-butyl-$N^4$-cyclopropyl-6-methylthio-1,3,5-triazine-2,4-diamine, 4,5-dichloro-2-n-octyl-4-isothiazolin-3-one, bis(1-hydroxy-2(1H)-pyridinethionato-O,S)-(T-4) zinc, bis(1-hydroxy-2(1H)-pyridinethionato-O,S)-T-4) copper, zinc ethylene-1,2-bis-dithiocarbamate and cuprous oxide.

20. The structure according to claim 17, wherein the one or more biocides of the coating composition are selected from the group consisting of zinc pyrithione, copper pyrithione, 4,5-dichloro-2-n-octyl-4-isothiazolin-3-one and cuprous oxide.

21. The structure according to claim 17, wherein at least one biocide of the coating composition is a cuprous oxide.

22. The structure according to claim 17, wherein one or more biocides of the coating composition is a pyrithione complex and cuprous oxide.

23. The structure according to claim 17, wherein at least one biocide of the coating composition is a pyrithione complex.

* * * * *

UNITED STATES PATENT AND TRADEMARK OFFICE
CERTIFICATE OF CORRECTION

PATENT NO.        : 9,534,121 B2
APPLICATION NO.   : 13/518161
DATED             : January 3, 2017
INVENTOR(S)       : Thorlaksen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 149 days.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*